US011284758B2

(12) United States Patent
Li et al.

(10) Patent No.: US 11,284,758 B2
(45) Date of Patent: Mar. 29, 2022

(54) MOTOR COVER FOR VACUUM CLEANER, MOTOR MODULE OF VACUUM CLEANER, AND VACUUM CLEANER

(71) Applicant: MIDEA ROBOZONE TECHNOLOGY CO., LTD., Suzhou (CN)

(72) Inventors: Yang Li, Suzhou (CN); Bing Li, Suzhou (CN); Fuping Cheng, Suzhou (CN)

(*) Notice: Subject to any disclaimer, the term of this patent is extended or adjusted under 35 U.S.C. 154(b) by 213 days.

(21) Appl. No.: 16/721,923

(22) Filed: Dec. 20, 2019

(65) Prior Publication Data

US 2020/0205625 A1  Jul. 2, 2020

(30) Foreign Application Priority Data

Dec. 29, 2018 (CN) .......................... 201811645789.0

(51) Int. Cl.
*A47L 9/00* (2006.01)
*A47L 9/28* (2006.01)
*H02K 5/20* (2006.01)

(52) U.S. Cl.
CPC ........... *A47L 9/0081* (2013.01); *A47L 9/2868* (2013.01); *H02K 5/20* (2013.01); *A47L 2201/04* (2013.01)

(58) Field of Classification Search
CPC ...... A47L 2201/04; A47L 9/0081; A47L 9/22; A47L 9/2868; H02K 5/20
See application file for complete search history.

(56) References Cited

U.S. PATENT DOCUMENTS

| 2004/0012285 A1* | 1/2004 | Buening | H02K 5/207 |
| | | | 310/89 |
| 2008/0098561 A1* | 5/2008 | Oh | A47L 9/22 |
| | | | 15/326 |
| 2018/0252238 A1* | 9/2018 | Hwang | F04D 29/667 |

(Continued)

FOREIGN PATENT DOCUMENTS

| CN | 102525334 A | * | 7/2012 |
| CN | 102525334 A | | 7/2012 |
| CN | 204718216 U | | 10/2015 |

(Continued)

OTHER PUBLICATIONS

CN-102525334-A—English Machine Translation (Year: 2012).*
OA1 for CN Application 201811645789.0.

*Primary Examiner* — Marc Carlson
(74) *Attorney, Agent, or Firm* — Kilpatrick Townsend & Stockton, LLP

(57) ABSTRACT

Disclosed are a motor cover for a vacuum cleaner, a motor module of a vacuum cleaner, and a vacuum cleaner. The motor cover has an inlet and an outlet, the motor cover is configured to mount an electric blower, and an air inlet end of the electric blower is configured to be disposed towards the inlet; the motor cover is provided with a plurality of flow guiding channels therein, and the plurality of flow guiding channels are sequentially communicated; one of the flow guiding channels is communicated with an air outlet end of the electric blower, and another flow guiding channel is communicated with the outlet; at least two of the plurality of flow guiding channels are arranged along an axial direction of the electric blower and guide airflow along a circumferential direction of the electric blower.

9 Claims, 2 Drawing Sheets

(56) References Cited

U.S. PATENT DOCUMENTS

2019/0027996 A1* 1/2019 Lang ..................... H02K 17/16

FOREIGN PATENT DOCUMENTS

| CN | 105240318 A | 1/2016 |
| CN | 206834914 U | 1/2018 |
| CN | 207884406 U | 9/2018 |
| WO | 2017092832 A1 | 6/2017 |

* cited by examiner

MOTOR COVER FOR VACUUM CLEANER, MOTOR MODULE OF VACUUM CLEANER, AND VACUUM CLEANER

CROSS-REFERENCES TO RELATED APPLICATIONS

The present application is based on and claims priority to Chinese patent application number 201811645789.0, filed on Dec. 29, 2018, the entire disclosure of which is hereby incorporated by reference.

FIELD

The present disclosure relates to a field of vacuum cleaner apparatuses, and more particularly to a motor cover for a vacuum cleaner, a motor module of a vacuum cleaner, and a vacuum cleaner.

BACKGROUND

At present, sweeping robots are more and more popular among young consumers due to their high degree of intelligence and flexibility. A core power module of the sweeping robot is usually composed of an electric blower module and a duct system. In order to reduce vibration and airflow noise generated during operation of the electric blower, most sweeping robots employ a combination of a volute and a cushion to reduce overall noise. The motor volute can improve the efficiency of the electric blower, and the cushion can reduce the amount of vibration radiated from the motor to the casing. Some robots extend airflow length by designing flow channels in the body, to achieve a purpose of noise reduction.

In motor modules of existing vacuum cleaners, motor cover schemes for reducing motor noise mainly include a motor cover structure in a horizontal vacuum cleaner. In this motor cover scheme, the motor is arranged in a center position inside the motor cover; the motor cover is provided with a plurality of layers of airflow partition plates around the motor, and flow guiding channels are formed among the different partition plates; inner and outer flow guiding channels can be connected in series by perforating the partition plates in different positions. The inner and outer partition plates are separated by baffles, to force the airflow to flow around the flow guiding channels, to achieve purposes of extending the air flow path and reducing noise.

In addition, there are some noise-reduction motor cover structures that are applied to cleaning robots. In the motor cover schemes, the motor is arranged in a middle portion of the motor cover, and airflow partition plates are arranged at the periphery, therefore the airflow is forced to flow out from an outlet, and after encountering the surface of the motor cover, the airflow turns and flows to the rear of the motor cover, to extend the air duct; in one embodiment, the airflow partition plates are arranged in a spiral shape to extend the air flow channel.

In one embodiment n, the arrangement of the plurality of layers of airflow partition plates in the motor cover scheme of the horizontal vacuum cleaner causes a large transverse dimension, which occupies more internal space of the vacuum cleaner. In the motor cover schemes of cleaning robots, the flow guiding channels of the motor cover are arranged above the motor air outlet, which makes it difficult for the motor cover to meet a short casing requirement for the sweeping robot in the height direction.

SUMMARY

To this end, the present disclosure proposes a motor cover for a vacuum cleaner, which has a better noise reduction effect and has smaller longitudinal and transverse dimensions.

The present disclosure also aims to propose a motor module of a vacuum cleaner having the above motor cover.

The present disclosure also aims to propose a vacuum cleaner having the above motor module.

The motor cover according to embodiments of the present disclosure has an inlet and an outlet. The motor cover is configured to mount an electric blower, and an air inlet end of the electric blower is configured to be disposed towards the inlet. The motor cover is provided with a plurality of flow guiding channels therein, and the plurality of flow guiding channels are sequentially communicated. One of the flow guiding channels is communicated with an air outlet end of the electric blower, and another flow guiding channel is communicated with the outlet. At least two of the plurality of flow guiding channels are arranged along an axial direction of the electric blower and guide airflow along a circumferential direction of the electric blower.

For the motor cover according to the embodiments of the present disclosure, by arranging at least the flow guiding channels along the axial direction of the electric blower, the flow path is extended, and the noise is reduced. At the same time, the space in a height direction of the electric blower is fully utilized, so that the dimension of the motor cover in the height direction is reduced to some extent.

In some embodiments, the plurality of flow guiding channels are all annular, and the plurality of flow guiding channels are sequentially arranged along the axial direction of the electric blower; in two flow guiding channels at both ends in the axial direction of the electric blower, an inner wall of one flow guiding channel is provided with a first communication opening for communication with the air outlet end of the electric blower, and an outer wall of the other flow guiding channel is provided with the outlet; a second communication opening is provided between adjacent two flow guiding channels.

In some embodiments, an airflow entry point of each flow guiding channel is arranged centrally symmetrically with an airflow outflow point thereof in a circumferential direction.

In some embodiments, an axis of the first communication opening defines an angle with a radius line of the electric blower at the first communication opening.

In some embodiments, the motor cover comprises: a motor cover upper lid formed in a lid shape with an open lower end, the motor cover upper lid being provided with an inner wall panel, the inner wall panel being formed into a cylindrical shape with an open lower end, and the inner wall panel being provided with the first communication opening; a motor cover lower lid formed in a lid shape with an open upper end, the inlet and the outlet being disposed in a bottom wall and a peripheral wall of the motor cover lower lid respectively, and the motor cover lower lid being engaged with the motor cover upper lid; and a motor cover middle lid formed as a ring shape, the motor cover middle lid being interposed between the motor cover upper lid and the motor cover lower lid, an inner edge of the motor cover middle lid being connected to a lower edge of the inner wall panel, and the motor cover middle lid being provided with the second communication opening. A part above the motor cover middle lid and located outside the inner wall panel defines an upper flow guiding channel, and a part below the motor cover middle lid and located outside the electric blower defines a lower flow guiding channel.

In some specific embodiments, a plurality of the first communication openings is provided and penetrates the inner wall panel in a downward direction.

The motor module according to embodiments of the present disclosure includes: a motor cover configured as the motor cover described above; an electric blower provided in the motor cover, and the electric blower comprises a blower cover, an impeller, and a motor, the impeller is disposed in the blower cover, the motor is fixed on the blower cover, a motor shaft of the motor is connected to the impeller, and the blower cover has a first end disposed towards the inlet of the motor cover and a second end communicated with one flow guiding channel of the motor cover; and a sealing member provided between the motor cover and the electric blower.

In some embodiments, at least one flow guiding channel is defined between an outer wall of the blower cover and an inner wall of the motor cover.

In some specific embodiments, when the motor cover comprises a motor cover upper lid, a motor cover middle lid, and a motor cover lower lid, and the motor cover upper lid is provided with a cylindrical inner wall panel, the blower cover is spliced to an axial side of the inner wall panel; the sealing member comprises a first seal ring and a second seal ring, the first seal ring is disposed among the blower cover, the motor cover middle lid, and the inner wall panel, and the second seal ring is disposed between the blower cover and the motor cover lower lid.

In some embodiments, the motor is configured as an outer rotor type motor, the motor extends out of an end of the blower cover, and the motor cover is provided with a protection plate that is fitted over the outside of the motor.

In some embodiments, a sound absorbing member is provided within the motor cover.

The vacuum cleaner according to embodiments of the present disclosure includes a housing, and a motor module configured as the motor module described above.

For the vacuum cleaner according to the embodiments of the present disclosure, since the vacuum cleaner has the motor module described above, the transverse and height dimensions of the whole machine are reduced under the premise of reducing the working noise.

In some embodiments, the vacuum cleaner is configured as a cleaning robot, and the cleaning robot further comprises a walking device configured to drive the cleaning robot to walk.

BRIEF DESCRIPTION OF THE DRAWINGS

Embodiments of the present disclosure will become apparent and more readily appreciated from the following descriptions made with reference the accompanying drawings, in which.

Figure 1:
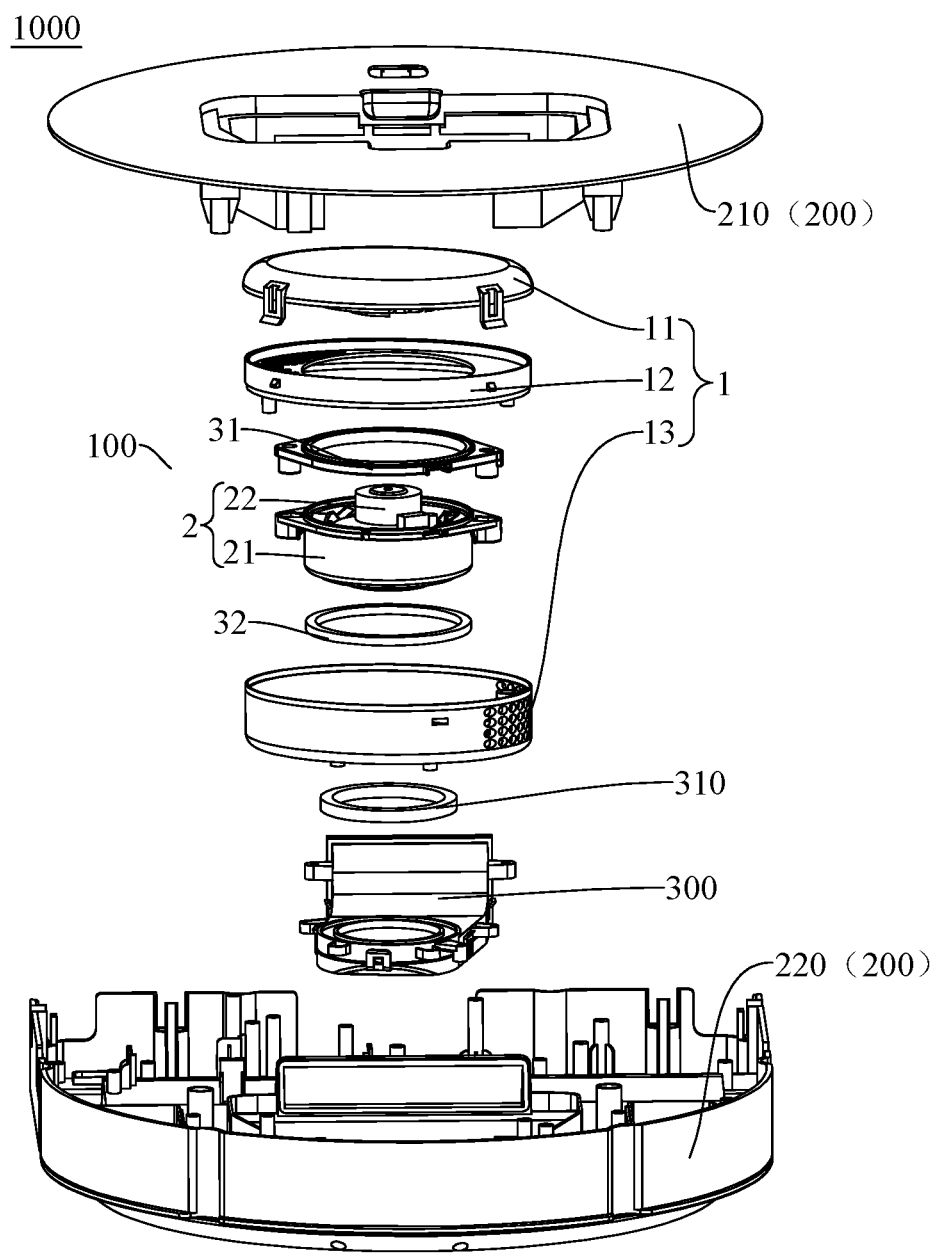
FIG. 1 illustrates an exploded view of a vacuum cleaner according to an embodiment of the present disclosure.

REFERENCE NUMERALS vacuum cleaner 1000,
  motor module 100,
    motor cover 1,
      motor cover upper lid 11, inner wall panel 111, first communication opening 1111, protection plate 112,
      motor cover middle lid 12, second communication opening 121,
      motor cover lower lid 13, inlet 131, outlet 132,
    electrical blower 2,
      blower cover 21,
      motor 22,
    sealing member 3,
      first sealing member 31,
      second sealing member 32,
    flow guiding channel 4,
      upper flow guiding channel 41, lower flow guiding channel 42,
  housing 200, upper casing 210, lower casing 220,
  air duct member 300, air duct seal ring 310.

DETAILED DESCRIPTION OF THE DISCLOSURE

Embodiments of the present disclosure will be described in detail and examples of the embodiments will be illustrated in the accompanying drawings, where same or similar reference numerals are used to indicate same or similar members or members with same or similar functions. The embodiments described herein with reference to the drawings are explanatory, which aim to illustrate the present disclosure, but shall not be construed to limit the present disclosure.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description, and do not indicate or imply that the referred devices or elements must have a particular orientation or be constructed and operated in a particular orientation. Thus, these terms shall not be constructed to limit the present disclosure. In addition, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications of two elements.

A motor cover 1 for a vacuum cleaner according to embodiments of the present disclosure will be described with reference to FIGS. 1 to 4.

Figure 2:
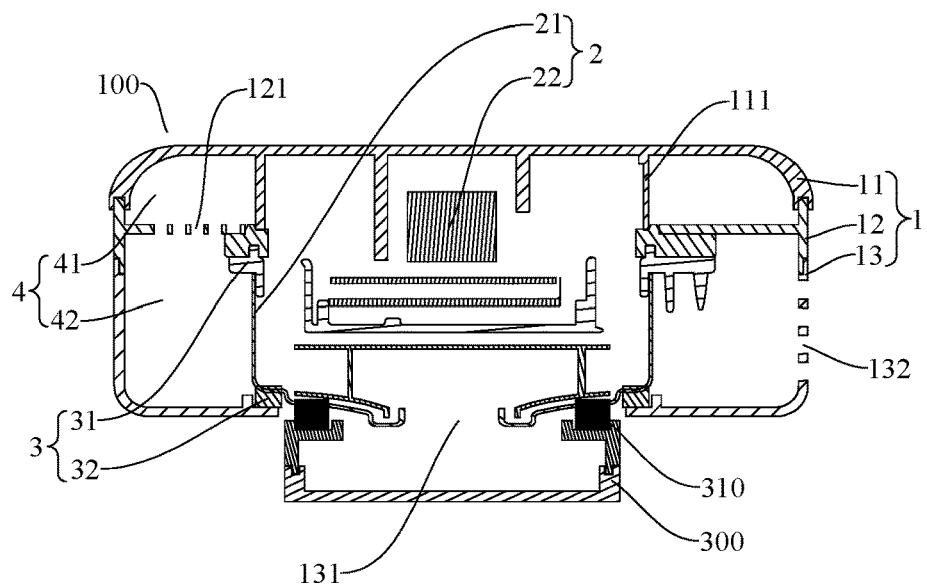
FIG. 2 illustrates a vertical sectional view of a motor module according to an embodiment of the present disclosure.

As illustrated in FIG. 2, the motor cover 1 according to the embodiments of the present disclosure has an inlet 131 and an outlet 132. The motor cover 1 is adapted to mount an electric blower 2, and an air inlet end of the electric blower 2 is adapted to be disposed towards the inlet 131. The motor cover 1 is provided with a plurality of flow guiding channels 4, and the plurality of flow guiding channels 4 are sequentially communicated. One of the flow guiding channels 4 is communicated with an air outlet end of the electric blower 2, and another flow guiding channel 4 is communicated with the outlet 132. At least two of the plurality of flow guiding channels 4 are arranged along an axial direction of the electric blower 2 and guide airflow along a circumferential direction of the electric blower 2.

It could be understood that, in the embodiments of the present disclosure, the airflow enters the motor cover 1 from the inlet 131 of the motor cover 1, enters through the air inlet end of the electric blower 2, then flows out from the air outlet end of the electric blower 2, and finally enters the flow guiding channels 4. Since at least two flow guiding channels 4 are provided in the present disclosure, and the two flow guiding channels 4 are arranged along the axial direction of the electric blower 2, the motor cover 1 according to the embodiments of the present disclosure has a smaller transverse dimension compared to spiral guiding grooves in the related art. Furthermore, the direction of the airflow in the flow guiding channels 4 is guided along the axial direction of the electric blower 2, that is, the projection of the flow guiding channels 4 on the vertical plane and the projection of the electric blower 2 on the vertical plane have an overlapped area, to fully facilitate the use of the height of the electric blower 2 to form a plurality of flow guiding channels 4. Compared with the related art that the motor cover 1 is disposed above the air outlet of the motor 22, the motor cover 1 according to the embodiments of the present disclosure has a smaller height. Therefore, the motor cover 1 according to the embodiments of the present disclosure has a smaller height and width under the premise of ensuring noise reduction, to achieve a miniaturized design of the vacuum cleaner.

For the motor cover 1 according to the embodiments of the present disclosure, by arranging at least the flow guiding channels 4 along the axial direction of the electric blower 2, the flow path is extended, and the noise is reduced. At the same time, the space in a height direction of the electric blower 2 is fully utilized, so that the dimension of the motor cover 1 in the height direction is reduced to some extent.

It should be noted that in the present disclosure, the motor cover 1 can be in various shapes, for example, a square, a circle or an oval, etc., and the specific shape of the motor cover 1 is not limited herein. The specific shape of the motor cover 1 can be designed based on actual needs. At the same time, the inlet 131 and the outlet 132 of the motor cover 1 may be formed into various shapes such as a circle, a square, or a grid, and the inlet 131 and the outlet 132 of the motor cover 1 are not specifically limited. The specific shapes of the inlet 131 and the outlet 132 of the motor cover 1 can be selected based on actual needs.

In some embodiments, the plurality of flow guiding channels 4 are all annular, and the plurality of flow guiding channels 4 are sequentially arranged along the axial direction of the electric blower 2. In two flow guiding channels 4 at both ends in the axial direction of the electric blower 2, an inner wall of one flow guiding channel is provided with a first communication opening 1111 for communication with the air outlet end of the electric blower 2, and an outer wall of the other flow guiding channel is provided with the outlet 132. A second communication opening 121 is provided between the adjacent two flow guiding channels 4. Therefore, when the airflow flows out from the air outlet end of the electric blower 2, it can enter one flow guiding channel 4 through the first communication opening 1111, and then enter other flow guiding channels 4 sequentially through a plurality of second communication openings 121. In such a way, it is ensured that the airflow travels a longer distance inside the motor cover 1, which is advantageous for noise reduction of the vacuum cleaner. In one embodiment, it should be noted here that since the first communication opening 1111 and the second communication opening 121 are both used for passage of the airflow, the first communication opening 1111 and the second communication opening 121 can be formed into any shape that facilitates the passage of the airflow. The specific shapes of the first communication opening 1111 and the second communication opening 121 are not limited herein.

It should be additionally noted that when the flow guiding channel 4 has a circular cross section, the electric blower 2 can be disposed at the circle center of the flow guiding channel 4, and can also be eccentrically disposed. When the electric blower 2 is eccentrically disposed with respect to the flow guiding channel 4, a blower cover 21 of the electric blower 2 can be in contact with the motor cover 1, and at this time, the airflow no longer passes from both sides of the electric blower 2, but passes from a single side, to create a diffuser structure similar to a volute, and reducing noise to a certain extent.

Figure 4:
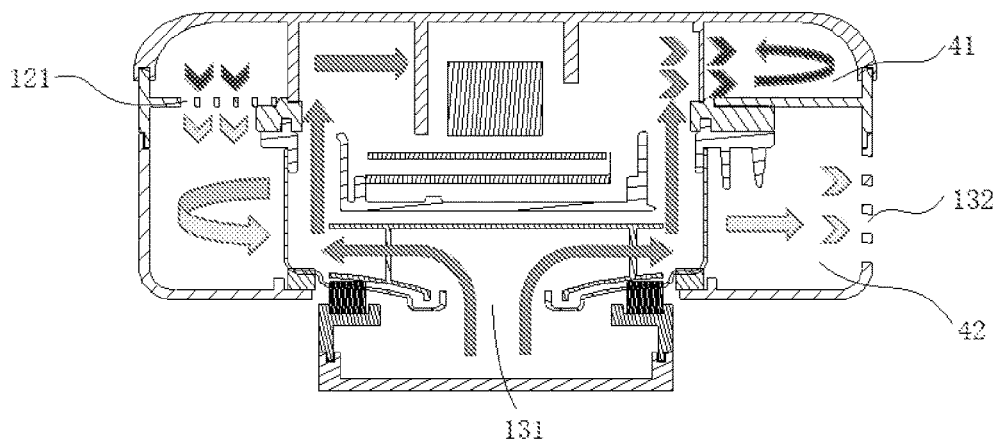
FIG. 4 is a schematic view illustrating air flow in a motor module according to an embodiment of the present disclosure.

In some embodiments, as shown in FIG. 4, an airflow entry point of each flow guiding channel 4 is arranged centrally symmetrically with an airflow outflow point thereof in a circumferential direction. Thus, the distance and time when the airflow flows in each flow guiding channel 4 can be extended to a maximum extent, to improve the noise reduction effect of the flow-guiding channel 4. In one embodiment, the airflow entry point and the airflow outflow point of each of the flow guiding channels 4 may be located at any two positions in the circumferential direction, and are not limited to the centrally symmetrical arrangement. In the actual applications, the airflow entry point and the airflow outflow point of each flow guiding channel 4 can be specifically selected based on actual needs.

In some embodiments, an axis of the first communication opening 1111 defines an angle with a radius line of the electric blower 2 at the first communication opening 1111. Thus, it is possible to enter the flow guiding channel 4 along a tangential direction from the first communication opening 1111, which reduces the possibility of turbulence at the first communication opening 1111 to some extent, to reduce noise.

In some embodiments, as shown in FIGS. 1-2, the motor cover 1 includes a motor cover upper lid 11, a motor cover lower lid 13, and a motor cover middle lid 12. The motor cover upper lid 11 is formed in a lid shape with an open lower end, and the motor cover upper lid 11 is provided with an inner wall panel 111. The inner wall panel 111 is formed into a cylindrical shape with an open lower end, and the inner wall panel 111 is provided with the first communication opening 1111. The motor cover lower lid 13 is formed in a lid shape with an open upper end, and the inlet 131 and the outlet 132 are disposed in a bottom wall and a peripheral wall of the motor cover lower lid 13 respectively. The motor cover lower lid 13 is engaged with the motor cover upper lid 11. The motor cover middle lid 12 is formed as a ring shape, and the motor cover middle lid 12 is interposed between the motor cover upper lid 11 and the motor cover lower lid 13. An inner edge of the motor cover middle lid 12 is connected to a lower edge of the inner wall panel 111, and the motor cover middle lid 12 is provided with the second communication opening 121. A part above the motor cover middle lid 12 and located outside the inner wall panel 111 defines an upper flow guiding channel 41, and a part below the motor cover middle lid 12 and located outside the electric blower 2 defines a lower flow guiding channel 42.

It could be understood that when the airflow enters the inside of the motor cover 1 from the inlet 131, the airflow first enters a chamber inside the inner wall panel 111, where the electric blower 2 is located, then enters the upper flow guiding channel 41 through the first communication opening 1111, enters the lower flow guiding channel 42 through the second communication opening 121 after flowing a distance in the upper flow guiding channel 41, and finally flows out of the motor cover 1 through the outlet 132 after flowing a distance in the lower flow guiding channel 42. Thus, the flow path of the airflow inside the motor cover 1 is greatly prolonged, and the noise reduction effect of the motor cover 1 is improved. In addition, according to the above description, the motor cover upper lid 11, the motor cover lower lid 13, and the motor cover middle lid 12 define the flow guiding channels 4, so that the motor cover 1 itself is used as a partition plate for the airflow, reducing the number of airflow partition plates, simplifying the structure of the motor cover 1, and decreasing the transverse size of the motor cover 1.

In one embodiment, as shown in FIG. 4, the first communication opening 1111 and the second communication opening 121 are staggered in the circumferential direction, to prevent the airflow from entering the lower flow guiding channel 42 through the second communication opening 121 directly after it enters the upper flow guiding channel 41 through the first communication opening 1111 from the air outlet end of the electric blower 2, which may otherwise cause a poor noise reduction effect.

In one embodiment, the motor cover upper lid 11 and the motor cover middle lid 12 are snap-connected, and the motor cover middle lid 12 and the motor cover lower lid 13 are snap-connected, to ensure the stability of the connection, and to some extent absorbing vibration generated by the rotation of the motor 22, to further improve the noise reduction capability of the motor cover 1. In one embodiment, in other embodiments of the present disclosure, the connection between the motor cover upper lid 11 and the motor cover middle lid 12, and the connection between the motor cover middle lid 12 and the motor cover lower lid 13 are not limited to the snap connection. It can be a screw connection, a rivet connection, or the like.

In one embodiment, it should be noted that, in the embodiments of the present disclosure, a plurality of the motor cover upper lids 11 can be sequentially stacked to improve the noise reduction effect of the motor cover 1. Further, a layer of the inner wall panel 111 or a plurality of layers of the inner wall panels 111 can be provided, such that the upper flow guiding channel 41 is formed in a spiral shape, to improve the noise reduction effect of the motor cover 1. For the same reason, a plurality of layers of airflow partition plates can be provided on an end of the motor cover middle lid 12 towards the motor cover lower lid 13, such that the lower flow guiding channel 42 is also formed in a spiral shape, to improve the noise reduction effect of the motor cover 1.

Figure 3:
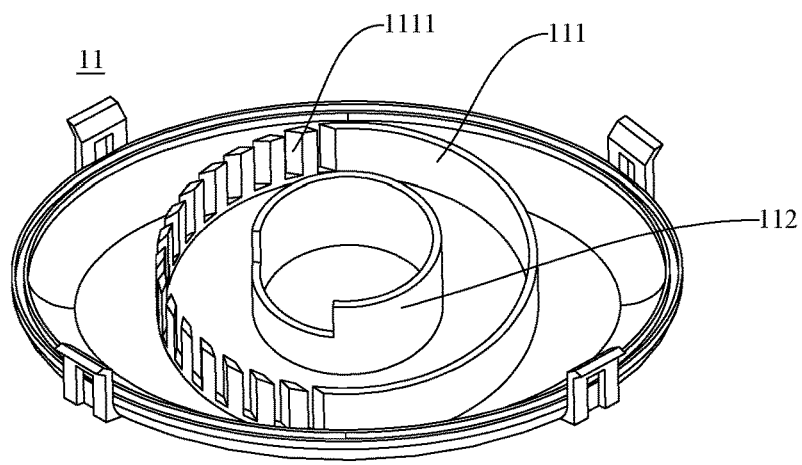
FIG. 3 illustrates a schematic view of an upper lid of a motor cover according to an embodiment of the present disclosure.

In some specific embodiments, as shown in FIG. 3, a plurality of the first communication openings 1111 is provided and penetrates the inner wall panel 111 in the downward direction. Therefore, it is ensured that the airflow at an air outlet section of the electric blower 2 can stably enter the upper flow guiding channel 41, and the first communication openings 1111 penetrate the inner wall panel 111 in the downward direction, which is advantageous for reducing wind resistance and decreasing noise.

A motor module 100 of a vacuum cleaner according to embodiments of the present disclosure will now be described with reference to FIGS. 3 to 4.

As shown in FIG. 3, the motor module 100 of the vacuum cleaner according to the embodiments of the present disclosure includes a motor cover 1, an electric blower 2, and a first sealing member 313. The motor cover 1 is a motor cover 1 described above. The electric blower 2 is disposed inside the motor cover 1. The electric blower 2 includes a blower cover 21, an impeller, and a motor 22. The impeller is disposed in the blower cover 21, and the motor 22 is fixed on the blower cover 21. A motor shaft of the motor 22 is connected to the impeller. The blower cover 21 has a first end disposed towards the inlet 131 of the motor cover 1, and a second end communicated with one flow guiding channel 4 of the motor cover 1. The first sealing member 313 is disposed between the motor cover 1 and the electric blower 2.

For the motor module 100 of the vacuum cleaner according to the embodiments of the present disclosure, since the motor module has the motor cover 1 described above, the transverse dimension and height dimension of the motor module 100 are reduced under the premise of reducing the operating noise.

In some embodiments, as shown in FIG. 3, at least one flow guiding channel 4 is defined between an outer wall of the blower cover 21 and an inner wall of the motor cover 1. Therefore, the flow guiding channel 4 is defined between an outer wall of the air duct and the inner wall of the motor cover 1, so that the airflow partition plates inside the motor module are omitted, to simplify the structure of the motor module, and reducing the transverse dimension of the motor module. In one embodiment, it should be noted here that in some embodiments of the present disclosure, a plurality of layers of airflow partition plates are provided between the outer wall of the blower cover 21 and the inner wall of the motor 22, such that the flow guiding channels 4 are all formed into a spiral shape. This further enhances the noise reduction effect, to reduce the operating noise of the motor module.

In some specific embodiments, as shown in FIG. 3, when the motor cover 1 includes a motor cover upper lid 11, a motor cover middle lid 12, and a motor cover lower lid 13, and the motor cover upper lid 11 is provided with a cylindrical inner wall panel 111, the blower cover 21 is spliced to an axial side of the inner wall panel 111. The sealing member 3 includes a first seal ring 31 and a second seal ring 32. The first seal ring 31 is disposed among the blower cover 21, the motor cover middle lid 12 and the inner wall panel 111, and the second seal ring 32 is disposed between the blower cover 21 and the motor cover lower lid 13. It could be understood that the first seal ring 31 and the second seal ring 32 can ensure the sealing effect at the connection, and can absorb noise generated by the motor cover upper lid 11, the motor cover middle lid 12, the blower cover 21, and the motor cover lower lid 13 due to the rotation of the motor 22, to further reduce the operating noise of the entire motor module.

In some embodiments, as shown in FIG. 2, the motor 22 is an outer rotor type motor, the motor 22 extends out of an end of the blower cover 21, and the motor cover 1 is provided with a protection plate 112 that is fitted over the outside of the motor 22. It could be understood that the presence of the protection plate 112 can not only reduce the damage rate of the motor 22, but also prolong the circulation path of the airflow in the motor cover 1 to a certain extent, to better reduce the operating noise of the motor module. It should be noted that the protection plate 112 mainly functions to protect the motor 22, that is, further extend the circulation path of the airflow, so that the specific shape of the protection plate 112 is not limited, and the shape and size of the protection plate 112 can be selected based on actual needs. In addition, in the embodiments of the present disclosure, a layer of the protection plate 112 or a plurality of layers of the protection plates 112 can be provided, and when the plurality of layers of the protection plates 112 are provided, the noise reduction effect of the motor cover 1 is better.

In addition, according to the foregoing, when the motor cover 1 includes the motor cover upper lid 11, the motor cover middle lid 12, and the motor cover lower lid 13, the part above the motor cover middle lid 12 and located outside the inner wall panel 111 defines the upper flow guiding channel 41, and the part below the motor cover middle lid 12 and located outside the electric blower 2 defines the lower flow guiding channel 42. In the case that the motor 22 is configured as an outer rotor type motor, the height of the upper flow guiding channel 41 is generated by a height difference between the impeller of the motor 22 and an outer rotor of the motor 22, and the motor cover upper lid 11 can be closer to the outer rotor of the motor 22, so the upper part of the motor cover 1 is only slightly higher than the outer rotor of the motor 22. The motor cover lower lid 13 is connected to the blower cover 21 through the sealing member 3, and the height difference between them is small. This solution ensures that the height of the motor cover 1 is not much different that of the body of the motor 22, such that the motor cover 1 can be installed in vacuum cleaners with limited installation space in the height direction (such as sweeping robots), to realize the purpose of noise reduction.

In some embodiments, a sound absorbing member is provided within the motor cover 1. Thus, the noise reduction effect of the motor cover 1 can be improved. In one embodiment, it should be noted herein that the function of the sound absorbing member is to improve the noise reduction effect, the sound absorbing member can be formed as a sound absorbing material of any shape, and the specific shape and material of the sound absorbing member are not limited herein.

A vacuum cleaner 1000 according to embodiments of the present disclosure includes a housing 200 and a motor module 300 as described above.

For the vacuum cleaner 1000 according to the embodiments of the present disclosure, since the vacuum cleaner has the motor module 100 described above, the transverse and height dimensions of the whole machine are reduced under the premise of reducing the working noise.

In some embodiments, the vacuum cleaner 1000 is a cleaning robot, and the cleaning robot further includes: a walking device that drives the cleaning robot to walk. It should be noted that, in the embodiments of the present disclosure, the walking device is mainly used to drive the cleaning robot to walk to facilitate the cleaning, and the specific type and structure of the walking device are not limited herein.

Embodiment

As shown in FIG. 1, the vacuum cleaner 1000 according to the present embodiment includes a motor module 100, a housing 200 and an air duct member 300. The air duct member 300 and the motor module 100 are located inside the housing 200. The motor module 100 is located above the air duct member 300 and connected to the air duct member 300, and an air duct seal ring 310 is provided between the motor module 100 and the air duct member 300.

The motor module 100 includes a motor cover 1, an electric blower 2, and a sealing member 3. The motor cover 1 is a motor cover 1 as described above, and the electric blower 2 is disposed in the motor cover 1. The electric blower 2 includes a blower cover 21, an impeller, and a motor 22. The impeller is disposed in the blower cover 21, the motor 22 is fixed on the blower cover 21, and a motor shaft of the motor 22 is connected to the impeller. The blower cover 21 has a first end disposed towards the inlet 131 of the motor cover 1, and a second end communicated with one flow guiding channel 4 of the motor cover 1. The sealing member 3 is disposed between the motor cover 1 and the electric blower 2.

The motor cover 1 has an inlet 131 and an outlet 132. The motor cover 1 is adapted to mount the electric blower 2, and an air inlet end of the electric blower 2 is adapted to be disposed towards the inlet 131. The motor cover 1 includes a motor cover upper lid 11, a motor cover lower lid 13, and a motor cover middle lid 12. The motor cover upper lid 11 is formed in a lid shape with an open lower end, and the motor cover upper lid 11 is provided with an inner wall panel 111. The inner wall panel 111 is formed into a cylindrical shape with an open lower end, and the inner wall panel 111 is provided with a first communication opening 1111. The motor cover lower lid 13 is formed in a lid shape with an open upper end, and the inlet 131 and the outlet 132 are disposed in a bottom wall and a peripheral wall of the motor cover lower lid 13 respectively. The motor cover lower lid 13 is engaged with the motor cover upper lid 11. The motor cover middle lid 12 is formed as a ring shape, and the motor cover middle lid 12 is interposed between the motor cover upper lid 11 and the motor cover lower lid 13. An inner edge of the motor cover middle lid 12 is connected to a lower edge of the inner wall panel 111, and the motor cover middle lid 12 is provided with a second communication opening 121. A part above the motor cover middle lid 12 and located outside the inner wall panel 111 defines an upper flow guiding channel 41, and a part below the motor cover middle lid 12 and located outside the electric blower 2 defines a lower flow guiding channel 42. The first communication opening 1111 and the second communication opening 121 are staggered by 180° in the circumferential direction. The sealing member 3 includes a first seal ring 31 and a second seal ring 32. The first seal ring 31 is disposed among the blower cover 21, the motor cover middle lid 12, and the inner wall panel 111, while the second seal ring 32 is disposed between the blower cover 21 and the motor cover lower lid 13.

The motor module of the vacuum cleaner of this embodiment provide the following functionality:

1. The existing sweeping robots do not use the motor cover 1 for noise reduction. This embodiment proposes a practical noise reduction scheme for motor modules of the sweeping robots.

2. With the split structure of the motor cover 1, the air flow path generated by the motor 22 is prolonged, and the airflow noise is reduced.

3. The motor cover 1 is vertically divided into two flow guiding channels 4 by the motor cover middle lid 12, so that the motor cover 1 can achieve the purpose of extending the length of the air duct without adding any extra guiding baffles in the transverse direction, reduce the transverse dimension of the motor cover 1, and increase the likelihood of applying the solution to the sweeping robots.

4. In the height direction of the motor cover 1, the height difference between the outer rotor of the motor 22 and the impeller of the motor 22 is fully utilized to form the flow guiding channel 4, so the motor cover 1 only needs to be slightly higher than the outer rotor of the motor 22. Hence, the solution can better control the height dimension of the motor cover 1.

5. The sealing member 3 in the motor cover 1 is simultaneously used for vibration isolation and sealing, to further reduce the working noise.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. The appearances of the above phrases throughout this specification are not necessarily referring to the same embodiment or example of the present disclosure. Furthermore, the particular features, structures, materials, or characteristics may be combined in any suitable manner in one or more embodiments or examples.

What is claimed is:

1. A motor cover for a vacuum cleaner, comprising:
an inlet and an outlet, wherein the motor cover is configured to mount an electric blower, and an air inlet end of the electric blower is configured to be disposed towards the inlet; the motor cover is provided with a plurality of flow guiding channels therein, one of the flow guiding channels is communicated with an air outlet end of the electric blower, and another flow guiding channel is communicated with the outlet; at least two of the plurality of flow guiding channels are arranged along an axial direction of the electric blower and guide airflow along a circumferential direction of the electric blower;
wherein the plurality of flow guiding channels are annular, and the plurality of flow guiding channels are sequentially arranged along the axial direction of the electric blower; in two of the flow guiding channels at both ends in the axial direction of the electric blower, an inner wall of one flow guiding channel is provided with a first communication opening for communication with the air outlet end of the electric blower, and an outer wall of the other flow guiding channel is provided with the outlet; a second communication opening is provided between adjacent two flow guiding channels;
wherein the motor cover comprises:
a motor cover upper lid formed in a lid shape with an open lower end, the motor cover upper lid being provided with an inner wall panel, wherein the inner wall panel being formed into a cylindrical shape with an open lower end, and the inner wall panel being provided with the first communication opening;
a motor cover lower lid formed in a lid shape with an open upper end, the inlet and the outlet being disposed in a bottom wall and a peripheral wall of the motor cover lower lid respectively, and the motor cover lower lid being engaged with the motor cover upper lid; and
a motor cover middle lid formed as a ring shape, the motor cover middle lid being interposed between the motor cover upper lid and the motor cover lower lid, an inner edge of the motor cover middle lid being connected to a lower edge of the inner wall panel, and the motor cover middle lid being provided with the second communication opening; and
wherein a part above the motor cover middle lid and located outside the inner wall panel defines an upper flow guiding channel, and a part below the motor cover middle lid and located outside the electric blower defines a lower flow guiding channel.

2. The motor cover according to claim 1, wherein an airflow entry point of each flow guiding channel is arranged centrally symmetrically with an airflow outflow point thereof in a circumferential direction.

3. The motor cover according to claim 1, wherein an axis of the first communication opening defines an angle with a radius line of the electric blower at the first communication opening.

4. The motor cover according to claim 1, wherein a plurality of the first communication openings is provided and penetrates the inner wall panel in a downward direction.

5. A motor module for a vacuum cleaner, comprising:
a motor cover for a vacuum cleaner, comprising:
an inlet and an outlet, wherein the motor cover is configured to mount an electric blower, and an air inlet end of the electric blower is configured to be disposed towards the inlet; the motor cover is provided with a plurality of flow guiding channels therein, one of the flow guiding channels is communicated with an air outlet end of the electric blower, and another flow guiding channel is communicated with the outlet; at least two of the plurality of flow guiding channels are arranged along an axial direction of the electric blower and guide airflow along a circumferential direction of the electric blower;
an electric blower provided in the motor cover, wherein the electric blower comprises a blower cover, an impeller, and a motor, the impeller is disposed in the blower cover, the motor is fixed on the blower cover, a motor shaft of the motor is connected to the impeller, and the blower cover has a first end disposed towards the inlet of the motor cover and a second end communicated with one flow guiding channel of the motor cover; and
a sealing member provided between the motor cover and the electric blower;
wherein at least one flow guiding channel is defined between an outer wall of the blower cover and an inner wall of the motor cover;
wherein when the motor cover comprises a motor cover upper lid, a motor cover middle lid, and a motor cover lower lid, and the motor cover upper lid is provided with a cylindrical inner wall panel, the blower cover is spliced to an axial side of the cylindrical inner wall panel; the sealing member comprises a first seal ring and a second seal ring, the first seal ring is disposed among the blower cover, the motor cover middle lid, and the cylindrical inner wall panel, and the second seal ring is disposed between the blower cover and the motor cover lower lid.

6. The motor module according to claim 5, wherein the motor is configured as an outer rotor type motor, the motor extends out of an end of the blower cover, and the motor cover is provided with a protection plate that is fitted over the outside of the motor.

7. The motor module according to claim 5, wherein a sound absorbing member is provided within the motor cover.

8. A vacuum cleaner, comprising:
a housing; and
a motor module of the vacuum cleaner, comprising:
a motor cover for the vacuum cleaner, comprising:
an inlet and an outlet, wherein the motor cover is configured to mount an electric blower, and an air inlet end of the electric blower is configured to be disposed towards the inlet; the motor cover is provided with a plurality of flow guiding channels therein, one of the flow guiding channels is communicated with an air outlet end of the electric blower, and another flow guiding channel is communicated with the outlet; at least two of the plurality of flow guiding channels are arranged along an axial direction of the electric blower and guide airflow along a circumferential direction of the electric blower;

an electric blower provided in the motor cover, wherein the electric blower comprises a blower cover, an impeller, and a motor, the impeller is disposed in the blower cover, the motor is fixed on the blower cover, a motor shaft of the motor is connected to the impeller, and the blower cover has a first end disposed towards the inlet of the motor cover and a second end communicated with one flow guiding channel of the motor cover; and a sealing member provided between the motor cover and the electric blower;

wherein at least one flow guiding channel is defined between an outer wall of the blower cover and an inner wall of the motor cover;

wherein when the motor cover comprises a motor cover upper lid, a motor cover middle lid, and a motor cover lower lid, and the motor cover upper lid is provided with a cylindrical inner wall panel, the blower cover is spliced to an axial side of the cylindrical inner wall panel; the sealing member comprises a first seal ring and a second seal ring, the first seal ring is disposed among the blower cover, the motor cover middle lid, and the cylindrical inner wall panel, and the second seal ring is disposed between the blower cover and the motor cover lower lid.

9. The vacuum cleaner according to claim 8, wherein the vacuum cleaner is configured as a cleaning robot, and the cleaning robot further comprises a walking device configured to drive the cleaning robot to walk.

\* \* \* \* \*